United States Patent
Wang et al.

(10) Patent No.: US 7,817,784 B2
(45) Date of Patent: Oct. 19, 2010

(54) SYSTEM FOR MANAGING VOICE FILES OF A VOICE PROMPT SERVER

(75) Inventors: Sandy Chai-Jen Wang, Hayward, CA (US); Arumugam Appadurai, Sunnyvale, CA (US); John Robert LaBarge, Palo Alto, CA (US); Margaret Ann Boothroyd, San Francisco, CA (US); Cory Andrew Luellen, Mountain View, CA (US); Mang Kang Yong, Menlo Park, CA (US); Leo K. Chiu, Daly City, CA (US)

(73) Assignee: Apptera, Inc., Sunnyvale, CA (US)

( * ) Notice: Subject to any disclaimer, the term of this patent is extended or adjusted under 35 U.S.C. 154(b) by 285 days.

(21) Appl. No.: 10/835,444

(22) Filed: Apr. 28, 2004

(65) Prior Publication Data
US 2005/0152516 A1 Jul. 14, 2005

Related U.S. Application Data

(60) Provisional application No. 60/532,271, filed on Dec. 23, 2003.

(51) Int. Cl.
*H04M 1/64* (2006.01)
*H04M 3/42* (2006.01)

(52) U.S. Cl. ................ 379/88.22; 379/201.05
(58) Field of Classification Search ........... 379/88.22
See application file for complete search history.

(56) References Cited

U.S. PATENT DOCUMENTS

| | | | | |
|---|---|---|---|---|
| 5,463,670 A * | 10/1995 | Chiang et al. | ............ | 379/27.04 |
| 5,557,539 A * | 9/1996 | Fitch | ............ | 709/206 |
| 5,675,637 A * | 10/1997 | Szlam et al. | ............ | 379/142.17 |
| 5,825,869 A * | 10/1998 | Brooks et al. | ............ | 379/265.12 |
| 5,832,062 A | 11/1998 | Drake | | |
| 6,035,018 A * | 3/2000 | Kaufman | ............ | 379/88.17 |
| 6,141,413 A * | 10/2000 | Waldner et al. | ............ | 379/88.17 |
| 6,199,076 B1 * | 3/2001 | Logan et al. | ............ | 715/501.1 |
| 6,351,679 B1 * | 2/2002 | Ainslie | ............ | 700/94 |
| 6,389,126 B1 * | 5/2002 | Bjornberg et al. | ............ | 379/201.03 |
| 6,490,564 B1 * | 12/2002 | Dodrill et al. | ............ | 704/275 |
| 6,513,063 B1 * | 1/2003 | Julia et al. | ............ | 709/219 |
| 6,587,556 B1 * | 7/2003 | Judkins et al. | ............ | 379/219 |
| 6,701,514 B1 * | 3/2004 | Haswell et al. | ............ | 717/115 |
| 6,742,021 B1 * | 5/2004 | Halverson et al. | ............ | 709/218 |

(Continued)

OTHER PUBLICATIONS

U.S. Appl. No. 60/532,271, Wang et al., priority claim.

(Continued)

*Primary Examiner*—Joseph T Phan
(74) *Attorney, Agent, or Firm*—Steven R. Sponseller; Stevens Law Group (57) ABSTRACT

A software interface is provided for managing audio resources used in one or more voice applications. The software interface includes a first portion thereof for mapping the audio resources from storage to use-case positions in the one or more voice applications, a portion thereof for accessing the audio resources according to the mapping information and for performing modifications thereof, a portion thereof for creating new audio resources; and a portion thereof for replication of modifications across distributed facilities. I a preferred application a developer can modify or replace existing audio resources and replicate links to the application code of the applications that use them.

12 Claims, 7 Drawing Sheets

U.S. PATENT DOCUMENTS

| | | | |
|---|---|---|---|
| 6,952,800 B1* | 10/2005 | Danner et al. | 715/234 |
| 7,027,990 B2* | 4/2006 | Sussman | 704/270.1 |
| 7,039,168 B1* | 5/2006 | Potts | 379/88.25 |
| 7,054,939 B2* | 5/2006 | Koch et al. | 709/227 |
| 7,062,544 B1* | 6/2006 | Ollis | 709/220 |
| 7,287,248 B1* | 10/2007 | Adeeb | 717/136 |
| 2001/0032234 A1* | 10/2001 | Summers et al. | 709/201 |
| 2003/0083882 A1* | 5/2003 | Schemers, III et al. | 704/270.1 |
| 2004/0006476 A1* | 1/2004 | Chiu | 704/270.1 |
| 2004/0017898 A1* | 1/2004 | Reynolds | 379/88.18 |
| 2004/0247093 A1* | 12/2004 | Potts et al. | 379/88.17 |
| 2005/0132261 A1* | 6/2005 | Da Palma et al. | 714/760 |
| 2006/0095860 A1* | 5/2006 | Wada et al. | 715/771 |

OTHER PUBLICATIONS

U.S. Appl. No. 60/558,921, filed Apr. 2004, Wang et al.
U.S. Appl. No. 60/574,041, filed May 2004, Chiu.
U.S. Appl. No. 60/581,924, filed Jun. 2004, DeGolia.
U.S. Appl. No. 10/861,078, filed Jun. 2004, Wang et al.

* cited by examiner

SYSTEM FOR MANAGING VOICE FILES OF A VOICE PROMPT SERVER

The present application claims priority to provisional Patent Application 60/532,271 entitled "Method and System for Managing Voice Prompt Recordings Prior to Deployment," filed on Dec. 23, 2003, which is incorporated in its entirety by reference.

FIELD OF THE INVENTION

The present invention is in the area of voice application software systems and pertains particularly to systems for developing and managing voice files linked for service to a voice application deployment system.

BACKGROUND OF THE INVENTION

A speech application is one of the most challenging applications to develop, deploy and maintain in a communications environment. Expertise required for developing and deploying a viable VXML application, for example, includes expertise in computer telephony integration (CTI) hardware and software or a data network telephony (DNT) equivalent, voice recognition software, text-to-speech software, and speech application logic.

With the relatively recent advent of voice extensive markup language (VXML) the expertise require to develop a speech solution has been reduced somewhat. VXML is a language that enables a software developer to focus on the application logic of the voice application without being required to configuring underlying telephony components. Typically, the developed voice application is run on a VXML interpreter that resides on and executes on the associated telephony system to deliver the solution.

Voice prompting systems in use to day range from a simple interactive voice response system for telephony to the more state-of-art VXML application system known to the inventors. Anywhere a customer telephony interface may be employed, there may also be a voice interaction system in place to interact with callers in real time. Data network telephony (DNT) equivalents of voice delivery system also exist like VoIP portals and the like.

Often in both VXML compliant and non-VXML systems, such as computer telephony integrated (CTI) IVRs, voice messaging services and the like, voice prompts are sometimes prerecorded in a studio setting for a number of differing business scenarios and uploaded to the enterprise system server architecture for access and deployment during actual interaction with clients. Pre-recording voice prompts instead of dynamically creating them through software and voice synthesis methods is many times performed when better sound quality, different languages, different voice types, or a combination of the above are desired for the presentation logic of a particular system.

In very large enterprise architectures there may be many thousands of prerecorded voice prompts stored for use by a given voice application. Some of these may not be stored in a same centralized location. One with general knowledge of voice file management will attest that managing such a large volume of voice prompts can be very complicated. For example, in prior-art systems management of voice prompts includes recording the prompts, managing identification of those prompts and manually referencing the required prompts in the application code used in developing the application logic for deployment of those prompts to a client interfacing system. There is much room for error in code referencing and actual development, recording, and sorting batches of voice files can be error prone and time consuming as well.

What is clearly needed is a system for managing voice prompts used by a voice interaction system that can solve the problems stated above.

SUMMARY OF THE INVENTION

In a preferred embodiment of the invention a software interface is provided for managing audio resources used in one or more voice applications. The interface includes a first portion thereof for mapping the audio resources from storage to use-case positions in the one or more voice applications, a second portion thereof for accessing the audio resources according to the mapping information and for performing modifications thereof, a third portion thereof for creating new audio resources, and a fourth portion thereof for replication of modifications across distributed facilities.

In one embodiment the software interface is executable from a PC connected to a network local to the stored resources. In another embodiment the software interface is executable from a PC connected to a network remote from the stored resources.

In a preferred embodiment modification of one or more audio resources is followed by automatic re-linking of the modified source files to the appropriate prompts existing in executable dialogs of the one or more voice applications. In a variation of this embodiment introduction of a replacement of one or more audio resources is followed by automated linking of the replacement resource or resources to the appropriate prompts existing in executable dialogs of the one or more voice applications using the old resource or resources replaced.

In one embodiment the replication portion causes modified audio resources to be replicated across distributed storage facilities for local client access from multiple client access points in a network. In one embodiment a voice application developer and a voice file author may share the software interface. In this embodiment the access point for the developer and the author is a Web server.

In one embodiment files associated with a modified audio resource include a text transcript, coaching notes, and URL or URI location information.

In another aspect of the present invention a method is provided for replicating a modified or replacement instance of an audio resource used in one or more voice applications to multiple storage sites for access in a distributed voice interaction network. The method includes steps (a) for selecting the old audio resource for modification or replacement from a list of audio resources, (b) for selecting from a mapping utility displayed as a result of resource selection, the voice application dialogs listed that will use the file; and (c) for saving the work associated with the final version of the edited resource.

In one aspect of the method, the network connecting the storage sites is a WAN. In another aspect the network connecting the storage sites is a telephony network wherein the storage sites are local to voice interaction systems.

In still another aspect of the present invention a method is provided for linking a modified or replacement instance of an audio resource used in one or more voice applications to multiple dialogs for use in a voice interaction network. He method includes steps (a) for selecting the old audio resource for modification or replacement from a list of audio resources, (b) for selecting from a mapping utility displayed as a result of resource selection, the voice application dialogs listed that will use the file; and (c) for saving the work associated with the final version of the edited resource.

In one aspect of the method in step (a) the list is a view of a directory and file system tree. In another aspect of the method in step (b) the mapping utility contains location information including URLs of applications, and URIs of dialogs, prompts, and audio resources.

DESCRIPTION OF THE PREFERRED EMBODIMENTS

The inventor provides a system for managing voice prompts in a voice application system. Detail about methods, apparatus and the system as a whole are described in enabling detail below.

Figure 1:
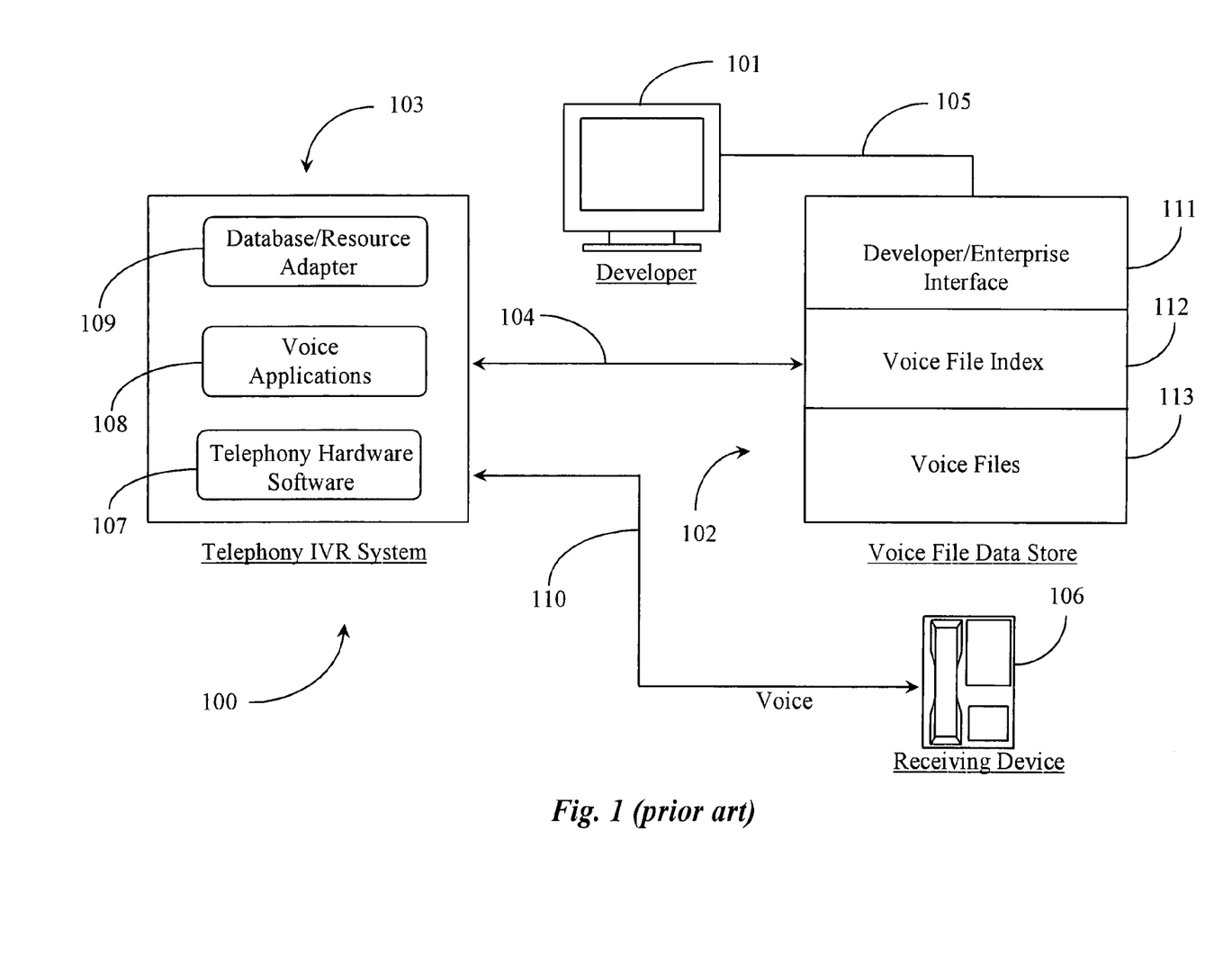
FIG. 1 is a logical overview of a voice interaction server and voice prompt data store according to prior-art.
Figure 2:
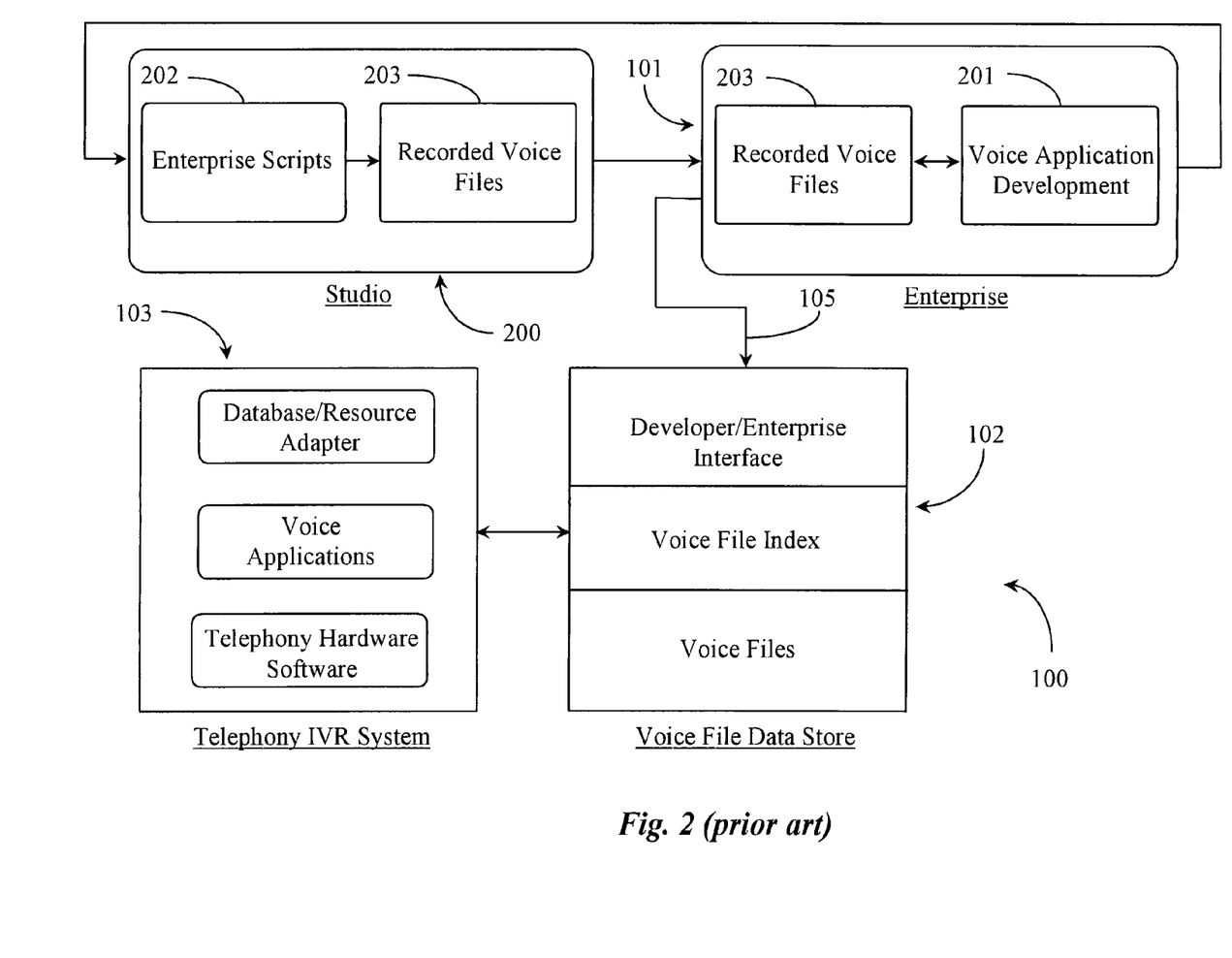
FIG. 2 is a block diagram illustrating voice prompt development and linking to a voice prompt application according to prior art.

FIG. 1 is a logical overview of a voice interaction server and voice prompt data store according to prior art. FIG. 2 is a block diagram illustrating voice prompt development and linking to a voice prompt application according to prior art. A voice application system 100 includes a developer 101, a voice file storage medium 102, a voice portal (telephony, IVR) 103, and one of possibly hundreds or thousands of receiving devices 106.

Device 106 may be a LAN-line telephone, a cellular wireless, or any other communication device that supports voice and text communication over a network. In this example, device 106 is a plane old telephone service (POTS) telephone.

Device 106 has access through a typical telephone service network, represented herein by a voice link 110, to a voice system 103, which in this example is a standard telephony IVR system. IVR system 103 is the customer access point for callers (device 106) to any enterprise hosting or leasing the system.

IVR 103 has a database/resource adapter 109 for enabling access to off-system data. IVR also has voice applications 108 accessible therein and adapted to provide customer interaction and call flow management. Applications 108 include the capabilities of prompting a customer, taking input from a customer and playing prompts back to the customer depending on the input received.

Telephony hardware and software 107 includes the hardware and software that may be necessary for customer connection and management of call control protocols. IVR 103 may be a telephony switch enhanced as a customer interface by applications 108. Voice prompts executed within system 103 may include only prerecorded prompts. A DNT equivalent may use both prerecorded prompts and XML-based scripts that are interpreted by a text-to-speech engine and played using a sampled voice.

IVR system 103 has access to a voice file data store 102 via a data link 104, which may be a high-speed fiber optics link or another suitable data carrier many of which are known and available. Data store 102 is adapted to contain prerecorded voice files, sometimes referred to as prompts. Prompts are maintained, in this example, in a section 113 of data store 102 adapted for the purpose of storing them. A voice file index 112 is illustrated and provides a means for searching store section 113 to access files for transmission over link 104 to IVR system 103 to be played by one of applications 108 during interaction with a client.

In this case IVR system 102 is a distributed system such as to a telephony switch location in a public switched telephone network (PSTN) and therefore is not equipped to store many voice files, which take up considerable storage space if they are high quality recordings.

Data store 111 has a developer/enterprise interface 111 for enabling developers such as developer 101 access for revising existing voice files and storing new and deleting old voice files from the data store. Developer 101 may create voice applications and link stored voice files to the application code for each voice application created and deployed. Typically, the voice files themselves are created in a separate studio from script provided by the developer.

As was described with reference to the background section, for a large enterprise there may be many thousands of individual voice prompts, many of which are linked together in segmented prompts or prompts that are played in a voice application wherein the prompts contain more than one separate voice file. Manually linking the original files to the application code when creating the application provides enormous room for human error. Although the applications are typically tested before deployment, errors may still get through causing monetary loss at the point of customer interface.

Another point of human management is between the studio and the developer. The studio has to manage the files and present them to the developer in a fashion that the developer can manipulate in an organized fashion. As the number of individual prerecorded files increases, so does the complexity of managing those prerecorded files.

Referring now to FIG. 2, developer 101 engages in voice application development activity 201. Typically voice files are recorded from script. Therefore, for a particular application developer 101 creates enterprise scripts 202 and sends them out to a studio (200) to be recorded. An operator within studio 200 receives scripts 202 and creates recorded voice files 203. Typically, the files are single segments, some of which may be strategically linked together in a voice application to play as a single voice prompt to a client as part of a dialog executed from the point of IVR 103, for example.

The enterprise must insure that voice files 203 are all current and correct and that the parent application has all of the appropriate linking in the appropriate junctions so that the files may be called up correctly during execution. Developer 101 uploads files 203 when complete to data store 102 and the related application may also be uploaded to data store 102. When a specific application needs to be run at a customer interface, it may be distributed without the voice files to the point of interface, in this case IVR 103. There may be many separate applications or sub-dialogs that use the same individual voice files. Often there will be many instances of the same voice file stored in data store 102 but linked to separate applications that use the same prompt in some sequence.

Figure 3:
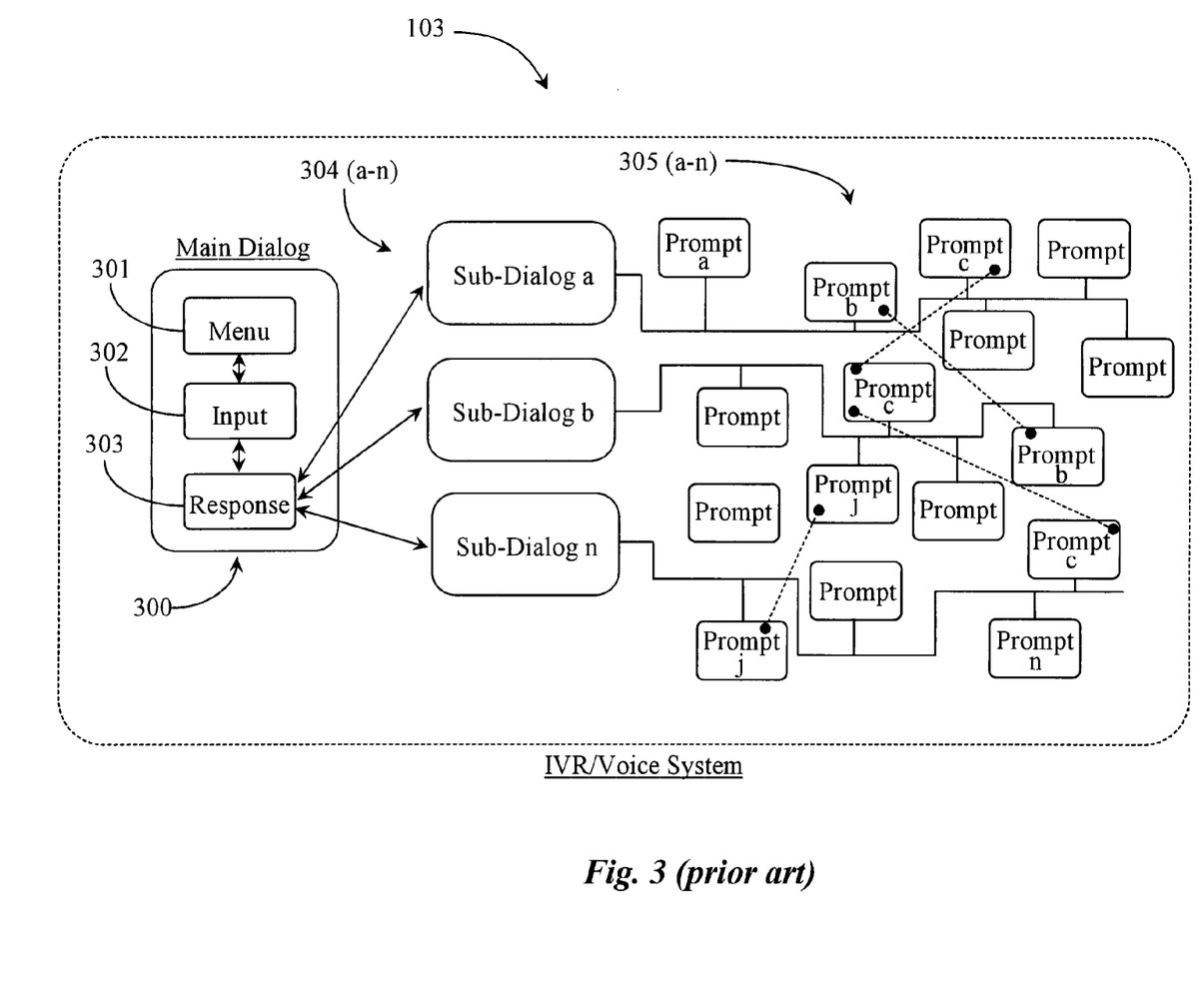
FIG. 3 is a block diagram illustrating a voice prompt development and management system according to an embodiment of the present invention.

FIG. 3 is an expanded view of IVR 103 of FIG. 2 illustrating a main dialog and sub-dialogs of a voice application according to prior art. In many systems, a main dialog 300 includes a static interactive menu 301 that is executed as part of the application logic for every client that calls in. During playing of menu 300, a client may provide input 302, typically in the form of voice for systems equipped with voice recognition technology. A system response 303 is played according to input 302.

System response 303 may include as options, sub-dialogs 304(a-n). Sub-dialogs 304(a-n) may link any number of prompts, or voice files 305(a-n) illustrated logically herein for each illustrated sub-dialog. In this case prompt 305b is used in sub-dialog 304a and in sub-dialog 304b. Prompt 305c is used in all three sub-dialogs illustrated. Prompt 305a is used in sub-dialog 304b and in sub-dialog 304b. Prompts are created at the time of application creation and deployment. Therefore prompts 305b, c, and j are stored in separate versions and locations for each voice application.

Figure 4:
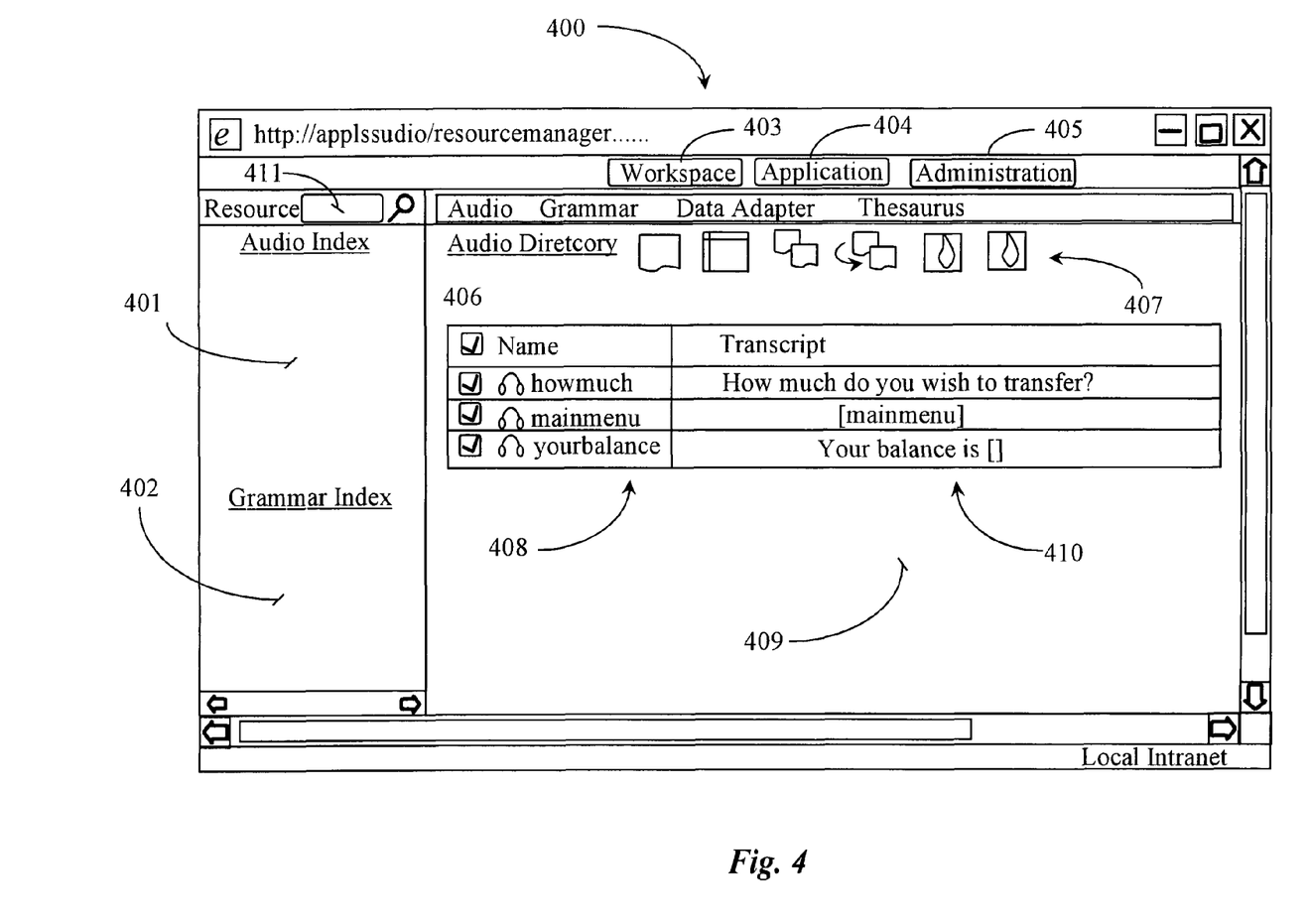
FIG. 4 illustrates an interactive screen for a voice application resource management application according to an embodiment of the present invention.

FIG. 4 illustrates an interactive screen 400 for a voice application resource management application according to an embodiment of the present invention. Screen 400 is a GUI portion of a software application that enables a developer to create and manage resources used in voice applications. Resources include both audio resources and application scripts that may be voice synthesized. For the purpose of this example, the inventor focuses on management of audio resources, which in this case, include voice file or prompt management in the context of one or more voice file applications.

Screen 400 takes the form of a Web browser type interface and can be used to access remote resources over a local area network (LAN), wide area network (WAN), or a metropolitan area network (MAN). In this example, a developer operating through screen 400 is accessing a local Intranet.

Screen 400 has a toolbar link 403 that is labeled workspace. Link 403 is adapted to open, upon invocation, a second window or changes the primary window to provide an area for working and audio management and creation tools for creating and working with audio files and transcripts or scripts.

Screen 400 has a toolbar link 404 that is labeled application. Link 404 is adapted to open, upon invocation, a second window or changes the primary window to provide an area for displaying and working with voice application code and provides audio resource linking capability. Screen 400 also has a toolbar link for enabling an administration view of all activity.

Screen 400 has additional toolbar links 406 adapted for navigating to different windows generally defined by label. Reading from left to right in toolbar options 406, there is Audio, Grammar, Data Adapter, and Thesaurus. The option Audio enables a user to view all audio-related resources. The option Grammar enables a user to view all grammar-related resources. The option Data Adapter enables a user to view all of the available adapters used with data sources, including adapters that might exist between disparate data formats. The option Thesaurus is self-descriptive.

In this example, a developer has accessed the audio resource view, which provides in window 409 an interactive data list 411 of existing audio resources currently available in the system. List 411 is divided into two columns a column 408 labeled "name" and a column 410 labeled "transcript". In this example there are three illustrated audio prompts reading from top to bottom from list 411 column 408 they are "howmuch", "mainmenu", and "yourbalance". An audio speaker icon next to each list item indicates the item is an audio resource and enable a developer to. Each audio resource is associated with the appropriate transcript of the resource as illustrated in column 410. Reading from top to bottom in column 410 for the audio resource "howmuch" the transcript is "How much do you wish to transfer?". For "mainmenu", the transcript is longer, therefore it in not reproduced in the illustration but may be assumed to be provided in full text. A scroll function may be provided to scroll a long transcript associated with an audio resource. For the audio resource "yourbalance", the transcript is "Your balance is [ ]. The brackets enclose a variable used in a voice system prompt response to a client input interpreted by the system.

In one embodiment there may be additional options for viewing list 411, for example, separate views of directory 411 may be provided in different languages. In one embodiment, separate views of directory 411 may be provided for the same resources recorded using different voice talents. In the case of voice files that are contextually the same, but are recorded using different voice talents and/or languages, those files may be stored together and versioned according to language and talent.

Window 409 can be scrollable to reach any audio resources not viewable in he immediate screen area. Likewise, in some embodiments a left-side navigation window may be provided that contains both audio resource and grammar resource indexes 401 and 402 respectively to enable quick navigation through the lists. A resource search function 411 is also provided in this example to enable keyword searching of audio and grammar resources.

Screen 400 has operational connectivity to a data store or stores used to where house the audio and grammar resources and, in some cases, the complete voice applications. Management actions initiated through the interface are applied automatically to the resources and voice applications.

A set of icons 407 defines additional interactive options for initiating immediate actions or views. For example, accounting from left to right a first icon enables creation of a new audio resource from a written script. Invocation of this icon brings up audio recording and editing tools that can be used to create new audio voice files and that can be used to edit or version existing audio voice files. A second icon is a recycle bin for deleting audio resources. A third icon in grouping 407 enables an audio resource to be copied. A fourth icon in grouping 407 enables a developer to view a dependency tree illustrating if where and when the audio file is used in one or more voice dialogs. The remaining two icons are upload and download icons enabling the movement of audio resources from local to remote and from remote to local storage devices.

In one embodiment of the present invention, the functions of creating voice files and linking them to voice applications can be coordinated through interface 400 by enabling an author of voice files password protected local or remote access for downloading enterprise scripts and for uploading new voice files to the enterprise voice file database. By marking audio resources in list 410 and invoking the icon 407 adapted to view audio resource dependencies, an operator calls up a next screen illustrating more detail about the resources and further options for editing and management as will be described below.

Screen 400, in this example, has and audio index display area 401 and a grammar display index area 402 strategically located in a left scrollable sub-window of screen 400. As detailed information is viewed for a resource in window 409, the same resource may be highlighted in the associated index 401 or 402 depending on the type of resource listed.

Figure 5:
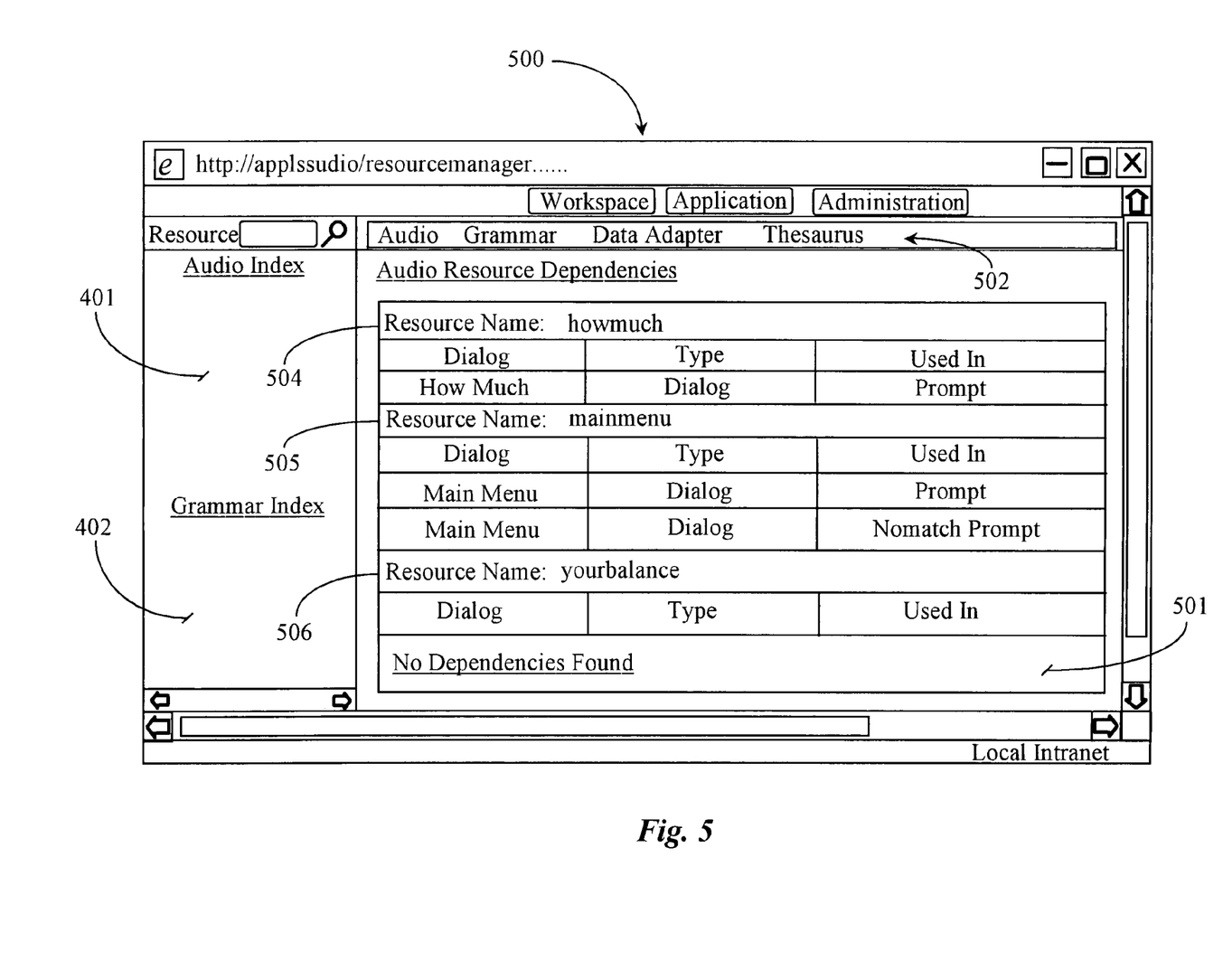
FIG. 5 illustrates an interactive screen having audio resource details and dependencies according to an embodiment of the present invention.

FIG. 5 is illustrates an interactive screen 500 showing audio resource details and dependencies according to an embodiment of the present invention. Screen 500 has a scrollable main window 501 that is adapted to display further details about audio resources previously selected for view. Previous options 406 remain displayed in screen 500. In this example each resource selected in screen 400 is displayed in list form. In this view audio resource 504 has a resource name "howmuch". The resource 504 is categorized according to Dialog, Dialog type, and where the resource is used in existing voice applications. In the case of resource 504, the dialog reference is "How Much", the resource type is a dialog, and the resource is used in a specified dialog prompt. Only one dependency is listed for audio resource 504, however all dependencies (if more than one) will be listed.

Resource 505, "mainmenu" has dependency to two main menus associated with dialogs. In the first listing the resource is used in a standard prompt used in the first listed dialog of the first listed main menu. In the second row it is illustrated that the same audio resource also is used in a nomatch prompt used in a specified dialog associated with the second listed main menu. For the purpose of this specification a nomatch prompt is one where the system does not have to match any data provided in a response to the prompt. A noinput prompt is one where no input is solicited by the prompt. It is noted herein that for a general application prompt definitions may vary widely according to voice application protocols and constructs used. The dependencies listed for resource 505 may be associated with entirely different voice applications used by the same enterprise. They may also reflect dependency of the resource to two separate menus and dialogs of a same voice application.

No specific ID information is illustrated in this example, but may be assumed to be present. For example, there may be rows and columns added for displaying a URL or URI path to the instance of the resource identified. Project Name, Project ID, Project Date, Recording Status (new vs. recorded), Voice Talent, and Audio Format are just some of the detailed information that may be made available in window 501. There may be a row or column added for provision of a general description of the resource including size, file format type, general content, and so on.

Resource 506, "yourbalance" is listed with no dependencies found for the resource. This may be because it is a newly uploaded resource that has not yet been linked to voice application code. It may be that it is a discarded resource that is still physically maintained in a database for possible future use. The lack of information tells the operator that the resource is currently not being used anywhere in the system.

Screen 500, in this example, has audio index display area 401 and a grammar display index area 402 strategically located in a left scrollable sub-window of screen 500 as described with reference to screen 400 of FIG. 4 above. As detailed information is viewed for a resource in window 501, the same resource may be highlighted in the associated index 401 or 402 depending on the type of resource listed.

Figure 6:
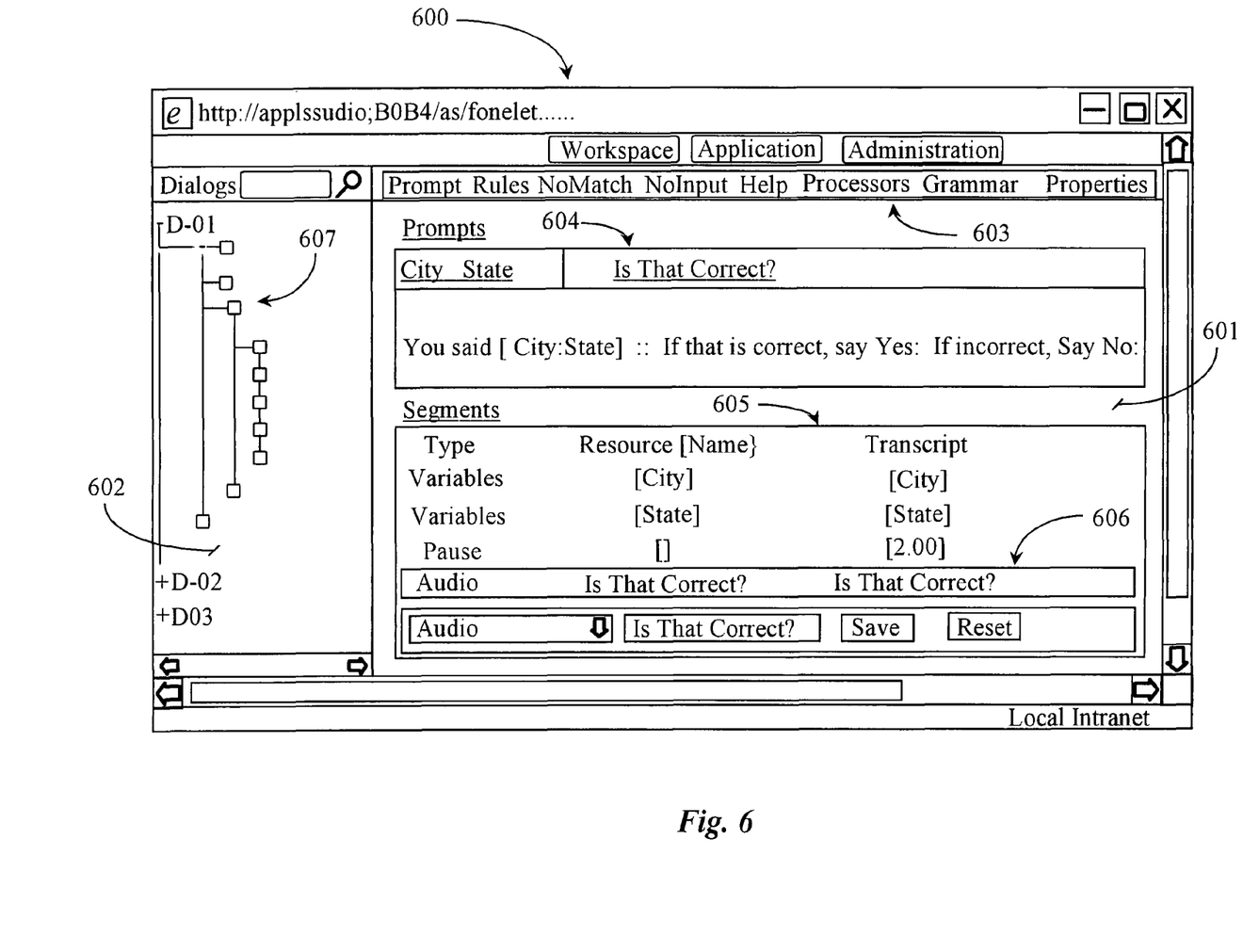
FIG. 6 illustrates an interactive screen for an audio resource manager illustrating further details and options for editing and management according to an embodiment of the present invention.

FIG. 6 illustrates an interactive screen 600 of an audio resource manager illustrating further details and options for editing and management according to an embodiment of the present invention. Screen 600 enables a developer to edit existing voice files and to create new voice files. A dialog tree window 602 is provided and is adapted to list all of the existing prompts and voice files linked to dialogs in voice applications. The information is, in a preferred embodiment, navigable using a convenient directory and file system format. Any voice prompt or audio resource displayed in the main window 601 is highlighted in the tree of window 602.

In one embodiment of the present invention from screen 500 described above, a developer can download a batch of audio resources (files) from a studio remotely, or from local storage and can link those into an existing dialog, or can create a new dialog using the new files. The process, in a preferred embodiment, leverages an existing database program such as MS Excel™ for versioning and keeping track of voice prompts dialogs, sub-dialogs, and other options executed during voice interaction.

In one embodiment of the present invention a developer can navigate using the mapping feature through all of the voice application dialogs referencing any selected voice files. In a variation of this embodiment the dialogs can be presented in descending or ascending orders according to some criteria specified like date, number of use positions, or some other hierarchical specification. In still another embodiment, a developer accessing an audio resource may also have access to any associated reference files like coaching notes, contextual notes, voice talent preferences, language preferences, and pronunciation nuances for different regions.

In a preferred embodiment, using the software of the present invention multiple links do not have to be created to replace an audio resource used in multiple dialog prompts of one or more voice applications. For example, after modifying a single voice file, one click may cause the link to the stored resource to be updated across all instances of the file in all existing applications. In another embodiment where multiple storage sites are used, replication may be ordered such that the modified file is automatically replicated to all of the appropriate storage sites for local access. In this case, the resource linking is updated to each voice application using the file according to the replication location for that application.

Screen 600 illustrates a prompt 604 being developed or modified. The prompt in this example is named "Is that correct?" and has variable input fields of City and State. The prompt 604 combines audio files to recite "You said [City: State]:: If that is correct, say Yes: If in correct, Say No: The prompt may be used in more than one dialog in more than one voice application. The prompt may incorporate more than one individual prerecorded voice file.

A window 605 contains segment information associated with the prompt "Is that correct?" such as the variable City and State and the optional transcripts (actual transcripts of voice files). New voice files and transcripts describing new cities and states may be added and automatically liked to all of the appropriate prompt segments used in all dialogs and applications.

Typically, audio voice files of a same content definition, but prerecorded in one or more different languages and/or voice talents will be stored as separate versions of the file. However, automated voice translation utilities can be used to translate an English voice file into a Spanish voice file, for example, on the fly as the file is being accessed and utilized in an application. Therefore, in a more advanced embodiment multiple physical prerecorded voice files do not have to be maintained.

Screen 600 has a set of options 603 for viewing creating or editing prompts, rules, nomatch prompts, and no-input prompts. Options for help, viewing processor details, help with grammar, and properties are also provided within option set 603. Workspace provides input screen or windows for adding new material and changes. The workspace windows can be in the form of an excel worksheet as previously described.

In one embodiment of the present invention linking voice files to prompts in application can be managed across multiple servers in a distributed network environment. Voice files, associated transcripts, prompt positions, dialog positions, and application associations are all automatically applied for the editor eliminating prior-art practice of re-linking the new resources in the application code. Other options not illustrated in this example may also be provided without departing from the spirit and scope of the present invention. For example, when a voice file used in several places has been modified, the editor may not want the exact version to be automatically placed in all use instances. In this case, the previous file is retained and the editor simply calls up a list of the use positions and selects only the positions that the new file applies to. The system then applies the new linking for only the selected prompts and dialogs. The old file retains the linking to the appropriate instances where no modification was required.

In another embodiment, voice file replication across distributed storage systems is automated for multiple distributed IVR systems or VXML portals. For example, if a developer makes changes to voice files in one storage facility and links those changes to all known instances of their use at other client access points, which may be widely distributed, then the distributed instances may automatically order replication of the appropriate audio resources from the first storage facility to all of the other required storage areas. Therefore, for voice applications that are maintained at local client-access facilities of a large enterprise that rely on local storage of prerecorded files can, after receiving notification of voice file linking to a new file or files can execute and order to retrieve those files from the original storage location and deposit them into their local stores for immediate access. The linking then is used as a road map to insure that all distributed sites using the same applications have access to all of the required files. In this embodiment audio resource editing can be performed at any network address wherein the changes can be automatically applied to all distributed facilities over a WAN.

Figure 7:
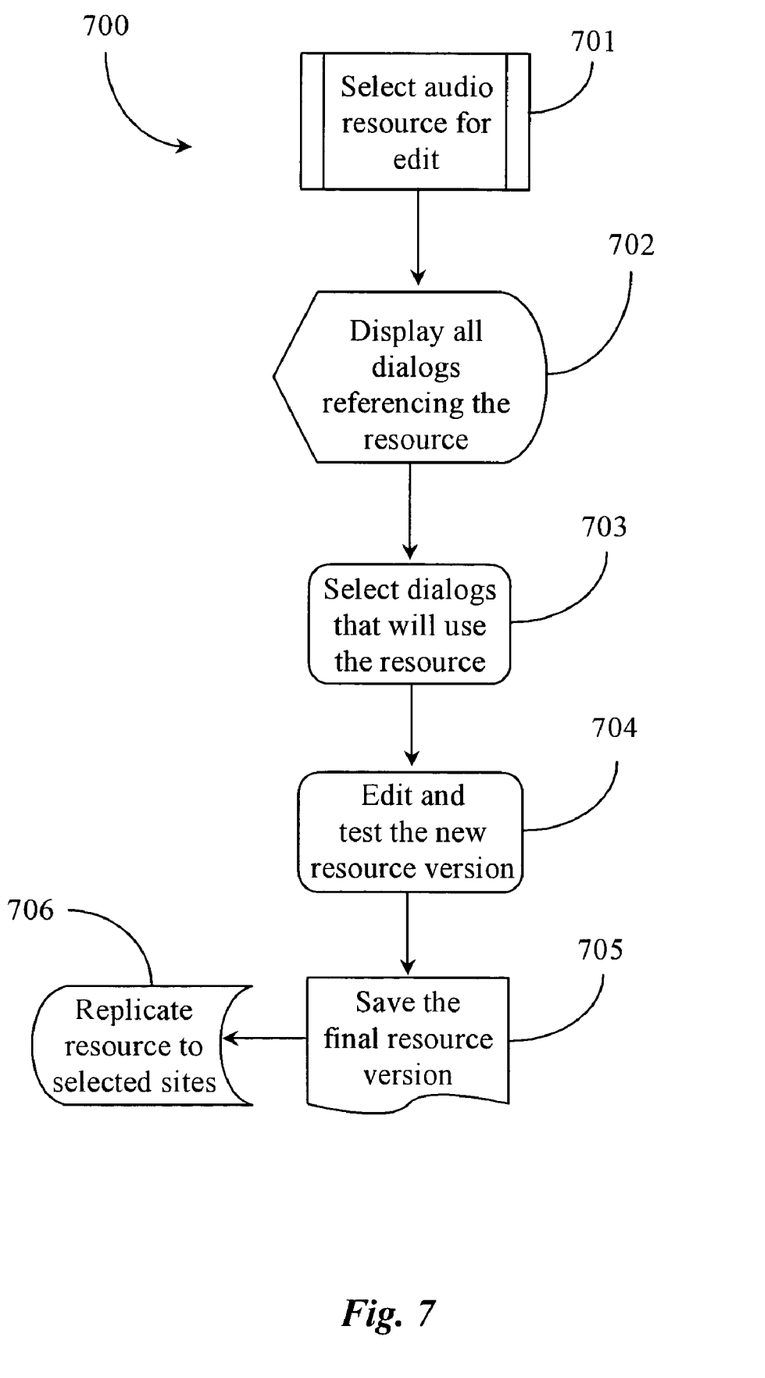
FIG. 7 is a process flow diagram illustrating steps for editing or replacing an existing audio resource and replicating the resource to distributed storage facilities.

FIG. 7 is a process flow diagram 700 illustrating steps for editing or replacing an existing audio resource and replicating the resource to distributed storage facilities. At step 701, the developer selects an audio resource for edit or replacement. The selection can be based on a search action for a specific audio resource or from navigation through a voice application dialog menu tree.

At step 702 all dialogs that reference the selected audio resource are displayed. At step 703, the developer may select the dialogs that will use the edited or replacement resource by marking or highlighting those listed dialogs. In one embodiment all dialogs may be selected. The exact number of dialogs selected will depend on the enterprise purpose of the edit or replacement.

At step 704, the developer edits and tests the new resource, or creates an entirely new replacement resource. At step 705, the developer saves the final tested version of the resource. At step 706, the version saved is automatically replicated to the appropriate storage locations referenced by the dialogs selected in step 703.

In this exemplary process, steps 702, and step 706 are automated results of the previous actions performed.

The methods and apparatus of the present invention can be applied on a local network using a central or distributed storage system as well as over a WAN using distributed or central storage. Management can be performed locally or remotely, such as by logging onto the Internet or an Intranet to access the software using password protection and/or other authentication procedures.

The methods and apparatus of the present invention greatly enhance and streamline voice application development and deployment and according to the embodiments described, can be applied over a variety of different network architectures including DNT and POTS implementations. The spirit and scope of the present invention should be limited only by the following claims.

What is claimed is:

1. An interactive graphical user interface for managing audio resources containing pre-recorded audio data used in one or more voice applications, the interactive graphical user interface comprising:

a first selectable icon initiating a command for mapping the audio resources from storage to use-case positions in the one or more voice applications, and for displaying an interactive list of the audio resources associated with the use-case positions;

a second selectable icon initiating a command for accessing individual audio resources according to the mapping information and selectable tools for performing modifications on the audio resources;

a third selectable icon initiating a command for creating a new audio resource;

a fourth selectable icon generating a dependency tree to illustrate usage of a plurality of audio files within the voice applications, wherein the dependency tree includes an indication of an audio file name, an audio file type, and at least one voice application associated with each audio file; and a selectable function for replication of modifications and of new audio resources across distributed facilities, including automatic re-linking of the new or modified audio resources to appropriate prompts existing in executable dialogs of the one or more voice applications, wherein the function for replication causes modified audio resources to be replicated across distributed storage facilities for local client access from multiple client access points in a network.

2. The interactive graphical user interface of claim 1 executable from a computing device connected to a network local to the stored resources.

3. The interactive graphical user interface of claim 1 executable from a computing device connected to a network remote from the stored resources.

4. The interactive graphical user interface of claim 1 shared by a voice application developer and a voice file author.

5. The interactive graphical user interface of claim 4 wherein an access point for the developer and the author is a Web server.

6. The interactive graphical user interface of claim 1 wherein files associated with a modified audio resource include a text transcript, coaching notes, and URL or URI location information.

7. A method for managing audio resources used in one or more voice applications, the method comprising:

(a) selecting an icon initiating a command for mapping the audio resources from storage to use-case positions in the one or more voice applications, and for displaying an interactive list of the audio resources associated with the use-case positions;

(b) selecting an individual audio resource displayed in the interactive list;

(c) selecting one or more icons initiating tools for modifying an existing audio resource, creating a new audio resource, or generating a dependency tree to illustrate usage of an audio file in voice dialogs, wherein the dependency tree includes an indication of an audio file name, an audio file type, and at least one voice application associated with each audio file; and (d) replicating modifications or new audio resources across distributed facilities, including automatic re-linking of the new or modified audio resources to appropriate prompts existing in executable dialogs of the one or more voice applications, wherein the replication causes new or modified audio resources to be replicated across distributed storage facilities for local client access from multiple client access points in a network.

8. The method of claim 7 executable from a computing device connected to a network local to the audio resources.

9. The method of claim 7 executable from a computing device connected to a network remote from the stored resources.

10. The method of claim 7 shared by a voice application developer and a voice file author.

11. The method of claim 10 wherein an access point for the developer and the voice file author is a web server.

12. The method of claim 7 wherein files associated with a new or a modified audio resource include a text transcript, coaching notes, and a URL or URI location information.

* * * * *